(12) United States Patent
Shikina et al.

(10) Patent No.: US 7,605,899 B2
(45) Date of Patent: Oct. 20, 2009

(54) ELECTROPHORETIC DISPERSION LIQUID AND ELECTROPHORETIC DISPLAY DEVICE

(75) Inventors: Noriyuki Shikina, Yokohama (JP); Hideo Mori, Yokohama (JP); Hideki Yoshinaga, Yokohama (JP); Tatsuhito Goden, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 10/552,590

(22) PCT Filed: Dec. 3, 2004

(86) PCT No.: PCT/JP2004/018433

§ 371 (c)(1),
(2), (4) Date: Aug. 7, 2006

(87) PCT Pub. No.: WO2005/055187

PCT Pub. Date: Jun. 16, 2005

(65) Prior Publication Data

US 2007/0133080 A1  Jun. 14, 2007

(30) Foreign Application Priority Data

Dec. 5, 2003 (JP) ............................ 2003-408273

(51) Int. Cl.
*G02F 1/1345* (2006.01)
*G02B 26/00* (2006.01)
*G09G 3/18* (2006.01)

(52) U.S. Cl. .................. 349/149; 359/296; 345/182
(58) Field of Classification Search .................. None
See application file for complete search history.

(56) References Cited

U.S. PATENT DOCUMENTS 5,461,400 A    10/1995   Ishii et al. ................ 345/182
2003/0011869 A1  1/2003  Matsuda et al. ............ 359/296

FOREIGN PATENT DOCUMENTS

EP        0 601 837      6/1994
WO     WO 03/079176      9/2003

*Primary Examiner*—Tina M Wong
(74) *Attorney, Agent, or Firm*—Fitzpatrick, Cella, Harper & Scinto (57) ABSTRACT

A display apparatus includes a display panel including pixels arranged in a matrix, pixel electrodes provided to the pixels, respectively, a common electrode provided commonly to the pixels, and scanning lines and signal lines for supplying a voltage to the pixel electrodes. In addition, a drive circuit is connected to the common electrode, the scanning lines, and the signal lines, and a control circuit provides a signal to the drive circuit. The control circuit selectively switches between a display drive mode in which an image is displayed on the display panel through sequential scanning of the scanning lines and application of a variable voltage to pixels via the signal lines by the drive circuit and a rewriting drive mode in which selected pixels are rewritten into black or white through application of a voltage, which is higher than a range of the variable voltage, to the selected pixels on a scanning line selected by the drive circuit.

9 Claims, 5 Drawing Sheets

ELECTROPHORETIC DISPERSION LIQUID AND ELECTROPHORETIC DISPLAY DEVICE

TECHNICAL FIELD

The present invention relates to electrophoretic dispersion liquid and an electrophoretic display device using the electrophoretic particles. Particularly, the present invention relates to a polymer as one component of the electrophoretic dispersion liquid.

BACKGROUND ART

In recent years, with development of information equipment, the needs for low-power and thin display devices have grown, so that extensive study and development have been made on display devices fitted to these needs. Of these display devices, a liquid crystal display devices has been developed actively as a display device capable of meeting the needs by electrically controlling alignment of liquid crystal molecules to change optical characteristic of the liquid crystal and has been brought into the commercial stage.

However, such a liquid crystal display device is accompanied with such problems that it has poor viewability of characters on a picture area due to a viewing angle or reflection light and that an eyestrain problem caused by flickering, low luminance, etc., of a light source is not sufficiently solved.

As a conventionally known display device which is low power consumption and thin and capable of solving the eyestrain problem, U.S. Pat. No. 3,612,758 has proposed an electrophoretic display device.

In the electrophoretic display device, a multiplicity of electrophoretic particles which are, e.g., positively charged and colored are dispersed in a space between a pair of substrates, each provided with an electrode, together with an electrophoretic dispersion liquid which is filled in the space and colored a color different from the color of the electrophoretic particles. Between the pair of substrates, a partition wall is formed so that it divides the space into a multiplicity of pixels along a planar direction of the substrates. By forming such a partition wall, it is possible to define the space between the pair of substrates while preventing movement of the electrophoretic particles in a pixel to other pixels and keeping uniform display.

In such an electrophoretic display device, when a positive-polarity voltage is applied to an observer's side electrode and a negative-polarity voltage is applied to an electrode on an opposite side, the positively charged electrophoretic particles are collected so as to cover the opposite side electrode, so that the color of the electrophoretic dispersion liquid (dispersion medium) is displayed when the electrophoretic display device is observed in such a state.

On the other hand, when a negative-polarity voltage is applied to the observer's side electrode and a positive-polarity voltage is applied to the opposite side electrode, the positively charged electrophoretic particles are collected so as to cover the observer's side electrode, so that the color of the electrophoretic particles is displayed when the electrophoretic display device is observed in such a state.

By performing such a drive of the electrophoretic display device on a pixel-by-pixel basis, any image or character is displayed by a multiplicity of pixels.

In a conventional electrophoretic display device, an electrophoretic dispersion liquid is prepared by adding, e.g., an electrifying agent or a dispersing agent into an insulating dispersion medium to impart a chargeability (electrification characteristic) and a dispersibility to electrophoretic particles. The chargeability of the electrophoretic particles results from creation of zeta potential at particle surface, and the dispersibility results from steric-exclusion effect by adsorption of the dispersing agent onto the particle surface.

U.S. Pat. No. 5,380,362 has disclosed such a method that a chargeability and a dispersibility are imparted to pigment particles in an electrophoretic dispersion liquid colored with a dye by using yellow pigment particles having an acidic site in combination with a charge control agent having a polymer chain containing a basic group.

Further, U.S. Pat. No. 6,590,696 has disclosed such a method that a chargeability and a dispersibility are imparted to particles in an electrophoretic dispersion liquid comprising a hydrocarbon solvent, particles having an acidic group (or a basic group), a basic (or acidic) polymer, and a compound having a nonionic polar group.

However, in the above described conventional electrophoretic display devices using electrophoretic dispersion liquids, additives have been precipitated at low temperatures in some cases. Particularly, in a low temperature environment of 0° C. to −20° C., when the electrophoretic display devices are driven, a polymeric additive is precipitated, thus causing a deterioration in display performance of the electrophoretic display devices.

DISCLOSURE OF THE INVENTION

An object of the present invention is to provide an electrophoretic dispersion liquid for an electrophoretic display device capable of displaying desired image and character with reliability without causing a deterioration of display performance even in a low temperature environment (e.g., from 0° C. to −20° C.).

Another object of the present invention is to provide a display apparatus using the electrophoretic dispersion liquid.

According to the present invention, there is provided an electrophoretic dispersion liquid for an electrophoretic display apparatus, comprising:

a plurality of electrophoretic particles each surface of which is modified by one of a basic group and an acidic group, a liquid for holding the electrophoretic particles to be dispersed therein, and a polydiene, having the other group, dissolved in the liquid.

According to the present invention, there is also provided a display apparatus, comprising:

an electrophoretic dispersion liquid which comprises a plurality of electrophoretic particles each surface of which is modified by one of a basic group and an acidic group, a liquid for holding the electrophoretic particles to be dispersed therein, and a polydiene, having the other group, dissolved in the liquid;

a closed cell for holding the electrophoretic dispersion liquid, and a first electrode and a second electrode for generating an electric field in the closed cell.

In the display apparatus, a voltage of a polarity which is alternately changed is applied between the first and second electrodes, and the electrophoretic particles are moved by an electric field generated by the first and second electrodes.

The present invention is characterized in that a polydiene having an acidic group is used as an acidic polymer in an electrophoretic dispersion liquid, containing the acidic polymer, which is filled in a space between a pair of substrates disposed opposite to each other and in which a plurality of electrophoretic particles each surface-modified by an acidic group are dispersed in an insulating liquid. In this case, the polydiene may preferably be a graft polydiene having an acidic group which has been grafted.

The present invention is also characterized in that a polydiene having a basic group is used as a basic polymer in an electrophoretic dispersion liquid, containing the basic polymer, which is filled in a space between a pair of substrates disposed opposite to each other and in which a plurality of electrophoretic particles each surface-modified by an basic group are dispersed in an insulating liquid. In this case, the polydiene may preferably be a graft polydiene having a basic group which has been grafted.

In the present invention, the polydiene described above may preferably be polydiene or polyisoprene.

The present invention further provides an electrophoretic display apparatus comprising a pair of substrates disposed with a spacing, and an electrophoretic dispersion liquid, disposed in the spacing, containing a plurality of electrophoretic particles which are dispersed therein and electrically moved to effect display, characterized in that any one of the above described electrophoretic dispersion liquids as the electrophoretic dispersion liquid for the electrophoretic display apparatus, The present invention is further characterized in that each of the pair of substrates is provided with an electrophoretic and a polarity of a voltage applied between the electrodes is changed thereby to move the electrophoretic particles.

The present invention is further characterized in that the pair of substrates are a first substrate provided with a first electrode and a second substrate which is disposed on an observer's and is provided with a second electrode, and a polarity of a voltage applied between the first and second electrodes is changed thereby to move the electrophoretic particles.

These and other objects, features and advantage of the present invention will become more apparent upon a consideration of the following description of the preferred embodiments of the present invention taken in conjunction with the accompanying drawings.

BEST MODE FOR CARRYING OUT THE INVENTION

Herein, the term "electrophoretic dispersion liquid" refers to a dispersion liquid comprising electrophoretic particles, a liquid for holding the electrophoretic particles in a dispersion state, and other substances inclusive of additives contained in the liquid. Accordingly, the electrophoretic dispersion liquid contains not only a liquid component but also a solid component such as solid particles. Further, the electrophoretic particles refers to particles which are electrically charged and moved in the electrophoretic dispersion liquid by applying thereto an electric field and are at least visually recognizable in their collected state. In other words, herein, particles which are, e.g., suspended in the liquid in an ionic state or an electrically charged state, are not the electrophoretic dispersion liquid.

Hereinbelow, preferred embodiments of the present invention will be described in detail with reference to the drawings.

First Embodiment

Figure 1:
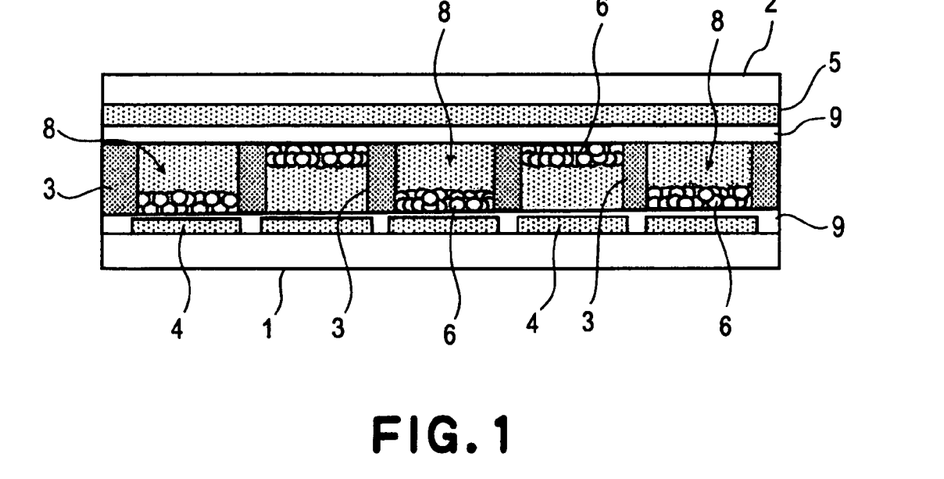
FIG. 1 is a schematic sectional view showing an embodiment of an electrophoretic display device using an electrophoretic dispersion liquid according to First Embodiment of the present invention.

FIG. 1 is a sectional view of an electrophoretic display device using an electrophoretic dispersion liquid according to First Embodiment of the present invention.

As shown in FIG. 1, the electrophoretic display device includes a first substrate 1, a second substrate 2, and a partition wall 3 disposed so that the first and second substrates 1 and 2 are oppositely disposed with a spacing. The first substrate 1 is provided with a first substrate 4, and the second substrate 2 is provided with a second substrate 5.

In a cell (space) defined by the first and second substrates 1 and 2 disposed with the spacing and the partition wall 3, an electrophoretic dispersion liquid 8 which comprises a plurality of electrophoretic particles 6 dispersed therein, an electrophoretic dispersion medium, and a polymer is sealed. On each of the first and second substrates 4 and 5, an insulating layer 9 is formed. A display surface of the electrophoretic display device is located on the second substrate 2 side.

The first electrode 4 is a pixel electrode and comprises a plurality of electrode portions which are independently capable of applying a desired electric field to the electrophoretic dispersion liquid 8 in an associated cell of the respective cells.

The first electrode 4 (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid 8 (electrophoretic particles 6) in each of the cells.

When the electric field is applied through the first electrode 4 as described above, the electrophoretic particles 6 in each individual cell are moved toward the first electrode 4 or the second electrode 5 depending on an electric field applied through by the first electrode 4. By the movement of the electrophoretic particles 6, at each pixel, the color (e.g., white) of the electrophoretic particles 6 and the color (e.g., blue) of the electrophoretic dispersion liquid 8 (electrophoretic dispersion medium) are selectively displayed. By effecting such a drive on a pixel-by-pixel basis, it is possible to effect display of arbitrary images and characters by use of corresponding pixels.

The first electrode 4 may be formed of a metal (vapor) deposition film of ITO (indium tin oxide), tin oxide, indium oxide, gold, chromium, etc., in a predetermined pattern through a photolithographic process. The second electrode 5 may be a transparent electrode formed of ITO film or an organic electroconductive film.

The first substrate 1 provided with the first electrode 4 may comprise an arbitrary insulating member, for supplying the electrophoretic display, such as glass or plastics. Further, the second substrate 2 provided with the second electrode 5 may comprise an insulating member, such as a transparent glass substrate or a transparent plastic substrate.

The insulating layer 9 can be formed of a colorless transparent insulating resin, such as acrylic resin, epoxy resin, fluorine-based resin, silicone resin, polyimide resin, polystyrene resin, or polyalkene resin.

The partition wall 3 can be formed of a polymeric material through, e.g., a method wherein the partition wall is formed with a photosensitive resin through the photolithographic process, a method wherein the partition wall which has been prepared in advance is bonded to the substrate, a method wherein the partition wall is formed through molding, or the like.

The method of filling the electrophoretic dispersion liquid 8 is not particularly limited but can be an ink jet method using nozzles.

As described above, in the electrophoretic dispersion liquid of the present invention, a basic polymer or an acidic polymer is added to a dispersion medium depending on an acidic group or a basic group of the electrophoretic particles. In the case where the electrophoretic particles 6 are surface-modified by the basic group, as a polymer for imparting the chargeability and the dispersibility to the electrophoretic particles 6, an acidic polymer 8 is used. In the present invention, as the acidic polymer 8, a polydiene having an acidic group is used. It is preferable that a graft polydiene having a grafted acidic group, such as polybutadiene or polyisoprene.

The polybutadiene and the polyisoprene have a Tg (glass transition point) of about −100° C. and a Tg of about −70° C., respectively. These polydienes have no crystal structure and are consisting only of noncrystalline portions, so that they assume large elongation property and flexibility, thus being widely used in rubber uses etc. A crystalline polymer having a number-average molecular weight of about 5,000 is ordinarily solid at room temperature. However, polydienes having the same molecular weight are characterized in that they are liquid polymers at room temperature and have a high solubility in a nonpolar solvent.

The acidic polymer is soluble in the electrophoretic dispersion medium described specifically later. The electrophoretic dispersion liquid 8 in which the acidic polymer is dissolved in the electrophoretic dispersion medium is does not cause precipitation at least in the temperature range of −20° C. to 0° C.

The number-average molecular weight of the acidic polymer used in the present invention may preferably be 1,000-100,000, more preferably 10,000-50,000. When the acidic polymer has the number-average molecular weight in such ranges, the acidic polymer fixed at the surfaces of the electrophoretic particles 6 can sufficiently exhibit a steric-exclusion effect by an acid-base interaction. Further, it is also possible to ensure a solubility thereof in the electrophoretic dispersion medium.

The number of acidic groups in the acidic polymer varies depending on the molecular weight of the acidic polymer but may preferably be 1-50 per one molecule, more preferably 3-20 per one molecule. When there is no acidic group in the acidic polymer, the resultant polymer fails to perform, formation of salt caused by the acid-base interaction and its dissociation with respect to the electrophoretic particles surface-modified with the basic group, thus failing to impart the dispersibility and the chargeability to the electrophoretic particles. On the other hand, the number of acidic groups in the acidic polymer is in the range of 1-50/molecule, the acidic polymer may suitably be used without causing a lowering in solubility in the electrophoretic dispersion medium.

The addition amount of the acidic polymer may preferably be 0.01 to 3 times, more preferably 0.1 to 1.5 times, a weight of the electrophoretic particles. When the acidic polymer is added in such ranges, the acidic polymer can sufficiently form a salt caused by the acid-base interaction and its dissociation with respect to the electrophoretic particles surface-modified with the basic group, thus imparting the dispersibility or the chargeability to the electrophoretic particles. Such an acidic polymer is preferable since there is no excessive acidic polymer which does not attribute to the interaction with the electrophoretic particles 6 surface-modified with the basic group.

As the acidic polymer 8, it is possible to use polydienes represented by the following [Formula 1] to [Formula 4]:

[Formula 1]

[Formula 2]

[Formula 3]

[Formula 4]

In the above [Formula 2] and [Formula 4], R represents a linear or branched alkyl group having 1-18 carbon atoms. Further, when the structure has a monoester portion, the monoester portion may include isomers.

Examples of the acidic polymer 8 may include: those of [Formula 1], such as polybutadiene-graft-maleic acid; those of [Formula 2], such as polybutadiene-graft-monomethyl maleate, polybutadiene-graft-monoethyl maleate, polybutadiene-graft-monopropyl maleate, polybutadiene-graft-monobutyl maleate, polybutadiene-graft-monopentyl maleate, polybutadiene-graft-monohexyl maleate, polybutadiene-graft-mono(2-ethylhexyl)maleate, polybutadiene-graft-monoheptyl maleate, polybutadiene-graft-monooctyl maleate, polybutadiene-graft-mononoyl maleate, polybutadiene-graft-monodecyl maleate, polybutadiene-graft-monododecyl maleate, polybutadiene-graft-monotetradecyl maleate, polybutadiene-graft-monohexadecyl maleate, and polybutadiene-graft-monostearyl maleate; those of [Formula 3], such as polyisoprene-graft-maleic acid; and those of [Formula 4], polyisoprene-graft-monomethyl maleate, polyisoprene-graft-monoethyl maleate, polyisoprene-graft-monopropyl maleate, polyisoprene-graft-monobutyl maleate, polyisoprene-graft-monopentyl maleate, polyisoprene-graft-monohexyl maleate, polyisoprene-graft-mono(2-ethylhexyl) maleate, polyisoprene-graft-monoheptyl maleate, polyisoprene-graft-monooctyl maleate, polyisoprene-graft-mononoyl maleate, polyisoprene-graft-monodecyl maleate, polyisoprene-graft-monododecyl maleate, polyisoprene-graft-monotetradecyl maleate, polyisoprene-graft-monohexadecyl maleate, and polyisoprene-graft-monostearyl maleate.

On the other hand, in this embodiment, in the case where the electrophoretic particles 6 are surface-modified by the acidic group, as a polymer for imparting the chargeability and the dispersibility to the electrophoretic particles 6, a basic polymer 8 is used. In the present invention, as the basic polymer 8, a polydiene having a basic group is used. It is preferable that a graft polydiene having a grafted basic group, such as polybutadiene or polyisoprene.

The basic polymer is soluble in the electrophoretic dispersion medium described specifically later. The electrophoretic dispersion liquid 8 in which the basic polymer is dissolved in the electrophoretic dispersion medium is does not cause precipitation at least in the temperature range of −20° C. to 0° C.

The number-average molecular weight of the basic polymer used in the present invention may preferably be 1,000-100,000, more preferably 10,000-50,000. When the basic polymer has the number-average molecular weight in such ranges, the basic polymer fixed at the surfaces of the electrophoretic particles 6 can sufficiently exhibit a steric-exclusion effect by an acid-base interaction. Further, it is also possible to ensure a solubility thereof in the electrophoretic dispersion medium.

The number of basic groups in the basic polymer varies depending on the molecular weight of the acidic polymer but may preferably be 1-50 per one molecule, more preferably 3-20 per one molecule. When there is no basic group in the basic polymer, the resultant polymer fails to perform, formation of salt caused by the acid-base interaction and its dissociation with respect to the electrophoretic particles surface-modified with the acidic group, thus failing to impart the dispersibility and the chargeability to the electrophoretic particles. On the other hand, the number of basic groups in the basic polymer is in the range of 1-50/molecule, the basic polymer may suitably be used without causing a lowering in solubility in the electrophoretic dispersion medium.

The addition amount of the basic polymer may preferably be 0.01 to 3 times, more preferably 0.1 to 1.5 times, a weight of the electrophoretic particles. When the basic polymer is added in such ranges, the basic polymer can sufficiently form a salt caused by the acid-base interaction and its dissociation with respect to the electrophoretic particles surface-modified with the acidic group, thus imparting the dispersibility or the chargeability to the electrophoretic particles. Such a basic polymer is preferable since there is no excessive basic polymer which does not attribute to the interaction with the electrophoretic particles 6 surface-modified with the acidic group.

As the basic polymer 8, it is possible to use polydienes represented by the following [Formula 5] to [Formula 8]:

[Formula 5]

[Formula 6]

[Formula 7]

[Formula 8]

In the above [Formula 5] and [Formula 7], R1 represents an alkylene group having 1-18 carbon atoms and R2 represents a linear or branched alkyl group having 1-18 carbon atoms. Further, in the above [Formula 6] and [Formula 8]. X represents an integer of 2-4.

Examples of the basic polymer 8 may include: those of [Formula 5], such as polybutadiene-graft-N-(aminomethyl)maleimide, polybutadiene-graft-N-(2-amionoethyl)maleimide, polybutadiene-graft-N-(4-aminobutyl)maleimide, polybutadiene-graft-N-(6-aminohexyl)maleimide, polybutadiene-graft-N-(dimethylaminomethyl)maleimide, polybutadiene-graft-N-(2-(dimethylamino)ethyl)maleimide, polybutadiene-graft-N-(4-(dimethylamino)butyl)maleimide, polybutadiene-graft-N-(6-dimethylamino)hexyl)maleimide, polybutadiene-graft-N-(diethylaminomethyl)maleimide, polybutadiene-graft-N-(2-diethylamino)ethyl)maleimide, polybutadiene-graft-N-(4-(diethylamino)butyl)maleimide, polybutadiene-graft-N-(6-(diethylamino)hexyl)maleimide, polybutadiene-graft-N-(dipropylaminomethyl)maleimide, polybutadiene-graft-N-(2-(dipropylamino)ethyl)maleimide, polybutadiene-graft-N-(4-dipropylamino)butyl)maleimide, polybutadiene-graft-N-(6-dipropylamino)hexyl)maleimide, polybutadiene-graft-N-(dibutylaminomethyl)maleimide, polybutadiene-graft-N-(2-dibutylamino)ethyl)maleimide, polybutadiene-graft-N-(4-dibutylamino)butyl)maleimide, polybutadiene-graft-N-(6-(dibutylamino)hexyl)maleimide, polybutadiene-graft-N-(dihexylaminometyl)maleimide, polybutadiene-graft-N-(2-dihexylamino)ethyl)maleimide, polybutadiene-graft-N-(4-(dihexylamino)butyl)maleimide, polybutadiene-graft-N-(6-(dihexylamino)hexyl)maleimide, polybutadiene-graft-N-(di(2-ethylhexyl)aminomethyl)maleimide, poly-butadiene-graft-N-(2-(di(2-ethylhexyl)amino)ethyl)maleimide, polybutadiene-graft-N-(4-(di(2-ethylhexyl)amino)butyl)maleimide, polybutadiene-graft-N-(6-(di(2-ethylhexyl)amino)hexyl)maleimide, polybutadiene-graft-N-(dioctylaminomethyl)maleimide, polybutadiene-graft-N-(2-(dioctylamino)ethyl)maleimide, polybutadiene-graft-N-(4-(dioctylamino)butyl)maleimide, polybutadiene-graft-N-(6-(dioctylamino)hexyl)maleimide, polybutadiene-graft-N-(didecylaminomethyl)maleimide, polybutadiene-graft-N-(2-(didecylamino)ethyl)maleimide, polybutadiene-graft-N-(4-(didecylamino)butyl)maleimide, polybutadiene-graft-N-(6-(didecylamino)hexyl)maleimide, polybutadiene-graft-N-(didodecylaminomethyl)maleimide polybutadiene-graft-N-(2-(didodecylamino)ethyl)maleimide, polybutadiene-graft-N-(4-(didodecylamino)butyl)maleimide, poly-butadiene-graft-N-(6-(didodecylamino)hexyl)maleimide, polybutadiene-graft-N-(distearylaminomethyl)maleimide, polybutadiene-graft-N-(2-(distearylamino)ethyl)maleimide, polybutadiene-graft-N-(4-(distearylamino)butyl)maleimide, and polybutadiene-graft-N-(6-(distearylamino)hexyl)maleimide; those of [Formula 6], such as polybutadiene-graft-N-(2-((2-aminoethyl)-amino)ethyl)maleimide, polybutadiene-graft-N-(2-((2-((2-aminoethyl)amino)ethyl)amino)ethyl) maleimide, and polybutadiene-graft-N-(2-((2-((2-((2-aminoethyl)-amino)ethyl)amino)ethyl)amino)ethyl) maleimide; those of [Formula 7], such as polyisoprene-graft-N-(aminomethyl)maleimide, polyisoprene-graft-N-(2-amionoethyl)maleimide, polyisoprene-graft-N-(4-aminobutyl)maleimide, polyisoprene-graft-N-(6-aminohexyl)maleimide, polyisoprene-graft-N-(dimethylaminomethyl)maleimide, polyisoprene-graft-N-(2-(dimethylamino)ethyl)maleimide, polyisoprene-graft-N-(4-(dimethylamino)butyl)maleimide, polyisoprene-graft-N-(6-dimethylamino)hexyl)maleimide, polyisoprene-graft-N-(diethylaminomethyl)maleimide, polyisoprene-graft-N-(2-diethylamino)ethyl)maleimide, polyisoprene-graft-N-(4-(diethylamino)butyl)maleimide, polyisoprene-graft-N-(6-(diethylamino)hexyl)maleimide, polyisoprene-graft-N-(dipropylaminomethyl)maleimide, polyisoprene-graft-N-(2-(dipropylamino)ethyl)maleimide, polyisoprene-graft-N-(4-dipropylamino)butyl)maleimide, polyisoprene-graft-N-(6-dipropylamino)hexyl)maleimide, polyisoprene-graft-N-(dibutylaminomethyl)maleimide, polyisoprene-graft-N-(2-dibutylamino)ethyl)maleimide, polyisoprene-graft-N-(4-dibutylamino)butyl)maleimide, polyisoprene-graft-N-(6-(dibutylamino)hexyl)maleimide, polyisoprene-graft-N-(dihexylaminometyl)maleimide, polyisoprene-graft-N-(2-dihexylamino)ethyl)maleimide, polyisoprene-graft-N-(4-(dihexylamino)butyl)maleimide, polyisoprene-graft-N-(6-(dihexylamino)hexyl)maleimide, polyisoprene-graft-N-(di(2-ethylhexyl)aminomethyl)maleimide, polyisoprene-graft-N-(2-(di(2-ethylhexyl)amino)ethyl)maleimide, polyisoprene-graft-N-(4-(di(2-ethylhexyl)amino)butyl)maleimide, polyisoprene-graft-N-(6-(di(2-ethylhexyl)amino)hexyl)maleimide, polyisoprene-graft-N-(dioctylaminomethyl)maleimide, polyisoprene-graft-N-(2-(dioctylamino)ethyl)maleimide, polyisoprene-graft-N-(4-(dioctylamino)butyl)maleimide, polyisoprene-graft-N-(6-(dioctylamino)hexyl)maleimide, polyisoprene-graft-N-(didecylaminomethyl)maleimide, polyisoprene-graft-N-(2-(didecylamino)ethyl)maleimide, polyisoprene-graft-N-(4-(didecylamino)butyl)maleimide, polyisoprene-graft-N-(6-(didecylamino)hexyl)maleimide, polyisoprene-graft-N-(didodecylaminomethyl)maleimide, polyisoprene-graft-N-(2-(didodecylamino)ethyl)maleimide, polyisoprene-graft-N-(4-(didodecylamino)butyl)maleimide, polyisoprene-graft-N-(6-(didodecylamino)hexyl)maleimide, polyisoprene-graft-N-(distearylaminomethyl)maleimide, polyisoprene-graft-N-(2-(distearylamino)ethyl)maleimide, polyisoprene-graft-N-(4-(distearylamino)butyl)maleimide, and polyisoprene-graft-N-(6-(distearylamino)hexyl)maleimide; those of [Formula 8], such as polyisoprene-graft-N-(2-((2-aminoethyl)amino)ethyl)maleimide, polyisoprene-graft-N-(2-((2-((2-aminoethyl)amino)ethyl)amino)ethyl)maleimide, and polyisoprene-graft-N-(2-((2-((2-((2-aminoethyl)amino)ethyl)amino)ethyl)amino)ethyl)maleimide.

As the electrophyoretic dispersion medium, it is possible to use a liquid, which is high insulative and colorless and transparent, including: aromatic hydrocarbons, such as toluene, xylene, ethylbenzene and dodecylbenzene; aliphatic hydrocarbons, such as hexane, cyclohexane, kerosine, normal paraffin and isoparaffin; halogenated hydrocarbons, such as chloroform, dichloromethane, pentachloroethane, 1,2-dibromoethane, 1,1,2,2-tetraburomoethane, trichloroethylene, tetrachloroethylene, trifluoroethylene and tetrafluoroethylene, various natural or synthetic oils, etc. These may be used singly or in mixture of two or more species.

The electrophoretic dispersion liquid may be colored with oil soluble dye having a color of R (red), G (green), B (blue), C (cyan), M (magenta), Y (yellow), etc. Examples of the dye may preferably include azo dyes, anthraquinone dyes, quinoline dyes, nitro dyes, nitroso dyes, penoline dyes, phthalocyanine dyes, metal complex salt dyes, naphthol dyes, benzoquinone dyes, cyanine dyes, indigo dyes, quinoimine dyes, etc. These may be used in combination.

Other examples of the oil soluble dye may include Vari Fast Yellow (1101, 1105, 3108, 4120), Oil Yellow (105, 107, 129, 3G, GGS), Vari Fast Red (1306, 1355, 2303, 3304, 3306, 3320), Oil Pink 312, Oil Scarlet 308, Oil Violet 730, Vari Fast Blue (1501, 1603, 1605, 1607, 2606, 2610, 3405). Oil Blue (2N, BOS, 613), Macrolex Blue RR, Sumiplast Gren G, Oil Green (502, BG), etc. A concentration of these dyes may preferably be 0.1-3.5 wt. %, per the electrophoretic dispersion medium 7.

As the electrophoretic particles 6 used in the present invention, it is possible to use particles of an organic pigment and an inorganic pigment which are surface-modified with an acidic group or a basic group, particles comprising a polymer modified with an acidic group or a basic group and a pigment dispersed in the polymer, particles comprising a polymer which is modified with an acidic group or a basic group and colored with a dye, etc. An average particle size of these particles may be 10 nm to 10 µm, preferably 15 nm to 5 µm.

The particles comprising the polymer modified with the acidic group or the basic group and the pigment dispersed in the polymer may be obtained by polymerizing an acidic monomer containing the pigment or a basic monomer containing the pigment.

As the polymer modified with the acidic group used for such particles, it is possible to use homopolymers of acidic monomers, such as (meth)acrylic acid, 2-butenoic acid (crotonic acid), 3-butenoic acid, (vinyl acetate), 3-methyl-3-butenoic acid, 3-pentenoic acid, 4-pentenoic acid, 4-methyl-4-pentenoic acid, 4-hexenoic acid, 5-hexenoic acid, 5-methyl-5-hexenoic acid, 5-heptenoic acid, 6-heptenoic acid, 6-methyl-6-heptenoic acid, 6-octenoic acid, 7-octenoic acid, 7-methyl-7-octenoic acid, 7-nonenoic acid, 8-nonenoic acid, 8-methyl-8-nonenoic acid, 8-decenoic acid, 9-decenoic acid, 3-phenyl-2-propenoic (cinnamic acid), carboxymethyl (meth)acrylate, carboxyethyl(meth)acrylate, vinyl benzoate, vinylphenyl acetate, vinylphenyl propionate, maleic acid, fumaric acid, methylenesuccinic acid (itaconic acid), hydroxystyrene, styrenesulfonic acid, vinyltoluenesulfonic acid, vinylsulfonic acid, sulfomethyl(meth)acrylate, 2-sulfoethyl(meth)acrylate, 2-propene-1-sulfonate, 2-methyl-2-propene-1-sulfonate, and 3-butene-1-sulfonate. It is also possible to use copolymers of the above described acidic monomers with olefin(alkene), diene, etc. Examples of olefin (alkene) may include ethylene, propylene, butene, isobutene, pentene, hexene, etc. Examples of diene may include butadiene, isoprene, etc.

On the other hand, as the polymer modified with the basic group, it is possible to use homopolymers of basic monomers, such as (meth)acrylate, ethyl(meth)acrylate, propyl(meth)acrylate, butyl(meth)acrylate, pentyl(meth)acrylate, hexyl(meth)acrylate, heptyl(meth)acrylate, octyl(meth)acrylate, nonyl(meth)acrylate, decyl(meth)acrylate, dodecyl(meth)acrylate, tetradecyl(meth)acrylate, hexadecyl(meth)acrylate, phenyl(meth)acrylate, benzyl(meth)acrylate, N-methylaminoethyl(meth)acrylate, N-ethylaminoethyl(meth)acrylate, N-propylaminoethyl(meth)acrylate, N-butylaminoethyl(meth)acrylate, N-pentylaminoethyl(meth)acrylate, N-hexylaminoethyl(meth)acrylate, N-octylaminoethyl(meth)acrylate, N-decylaminoethyl(meth)acrylate, N,N-dimethylamonoethyl(meth)acrylate, N,N-diethylaminoethyl(meth)acrylate, N,N-dipropylaminoethyl(meth)acrylate, N,N-dibutylaminoethyl(meth)acrylate, N,N-dipentylaminoethyl(meth)acrylate, N,N-dihexylaminoethyl(meth)acrylate, N,N-dioctylaminoethyl(meth)acrylate, N,N-didecylaminoethyl(meth)acrylate, (meth)acrylamide, N-methyl(meth)acrylamide, N-ethyl(meth)acrylamide, N-propyl(meth)acrylamide, N-butyl(meth)acrylamide, N,N-dimetyl(meth)acrylamide, N,N-diethyl(meth)acrylamide, N,N-dipropyl(meth)acrylamide, N,N-dibutyl(meth)acrylamide, dimethylaminostyrene, diethylaminostyrene, dibutylaminostyrene, vinylpyridine, and vinyl pyrrolidone. It is also possible to use copolymers of the above described basic monomers with olefin(alkene), diene, etc. Examples of olefin (alkene) and diene may include those described above therefor.

Examples of organic pigments may include azo pigments, phthalocyanine pigments, quinacridone pigments, isoindolinone pigments isoindolin pigments, dioxazine pigments, perylene pigments, perinone pigments, thioindigo pigments, quinophthalone pigments, anthraquinone pigments, nitro pigments, and nitroso pigments. Specific examples thereof may include: red pigments, such as Quinacridone Red, Lake Red, Brilliant Carmine, Perylene Red, Permanent Red, Toluidine Red and Madder Lake; green pigments, such as Diamond Green Lake, Phthalocyanine Green, and Pigment Green; blue pigments, such as Victoria Blue Lake, Phthalocyanine Blue, and Fast Sky Blue; yellow pigments, such as Hansa Yellow, Fast Yellow, Disazo Yellow, Isoindolinone Yellow, an Quinophthalone Yellow; and black pigments, such as Aniline Block and Diamond Black.

Examples of the inorganic pigments may include: white pigments, such as titanium oxide, aluminum oxide, zinc oxide, lead oxide, and zinc sulfide; black pigments, such as carbon black, manganese ferrite block, cobalt ferrite black, and titanium black; red pigments, such as cadmium red, red iron oxide, and molybdenum red; green pigments, such as chromium oxide, viridian, titanium cobalt green, cobalt green, and victoria green; blue pigments, such as ultramarine blue, prussian blue, and cobalt blue; and yellow pigments, such as cadmium yellow, titanium yellow, yellow iron oxide, chrome yellow, and antimony yellow.

As the particles comprising the polymer, modified with the acidic group or the basic group, colored with a dye, it is possible to use, e.g., particles comprising polymer particles, modified with the acidic group or the basic group, colored with a dye or particles obtained through polymerization of an acidic monomer containing a dye or of a basic monomer containing a dye. As the acidic monomer and the basic monomer, it is possible to use those described above therefor.

Next, a display operation of the electrophoretic display device using the above described electrophoretic dispersion liquid according to this embodiment will be described.

Figure 2:
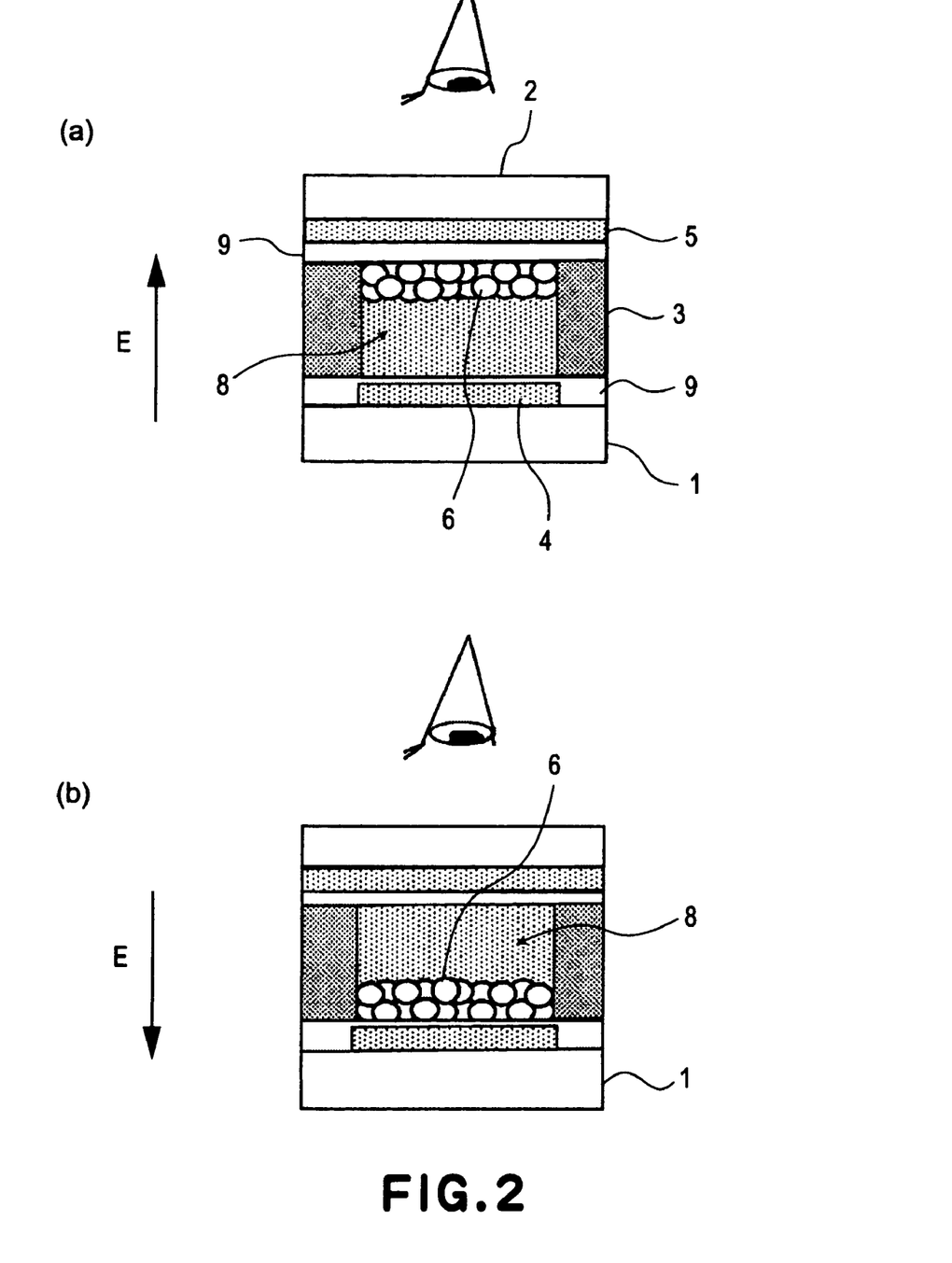
FIGS. 2(a) and 2(b) are schematic views showing a display example of the electrophoretic display device.

FIGS. 2(a) and 2(b) illustrate a display example wherein, e.g., an electrophoretic dispersion liquid 8 comprising white electrophoretic particles 6 surface-modified with a basic group, an electrophoretic dispersion medium colored with a blue dye, and an acidic polymer is filled in a cell. In these figures, the same signs or reference numerals as in FIG. 1 represent the same or corresponding members or means as in the structure shown in FIG. 1. The electrophoretic particles 6 surface-modified with the basic group is positively charged by the acid-base interaction with the acidic polymer.

When an electric field E is applied to the electrophoretic dispersion liquid in the direction shown in FIG. 2(a), the positively charged electrophoretic particles 6 are moved toward the upper side of the cell and distributed over the upper display surface. As a result, when the cell is observed from above, the cell looks white due to distribution of the white electrophoretic particles 6. On the other hand, when the electric field E is applied to the electrophoretic dispersion liquid in the arrow direction shown in FIG. 2(b), the white electrophoretic particles 6 are moved toward the bottom of the cell and distributed thereover, so that the cell looks blue when observed from above. Such a driving operation is effected pixel by pixel, whereby arbitrary images or characters can be displayed by using a large number of pixels.

As described above, as the acidic or basic polymer for impairing the chargeability and the dispersibility to the electrophoretic particles 6, the basic polymer having the acidic or basic group which is not precipitated in the electrophoretic dispersion medium at least in the low temperature environment of $-20$ to $0°$ C. is used. As a result, it is possible to provide an electrophoretic dispersion liquid 8 with reliability without causing deterioration in display quality even in the low temperature environment and an electrophoretic display device using the electrophoretic dispersion liquid 8.

Figure 3:
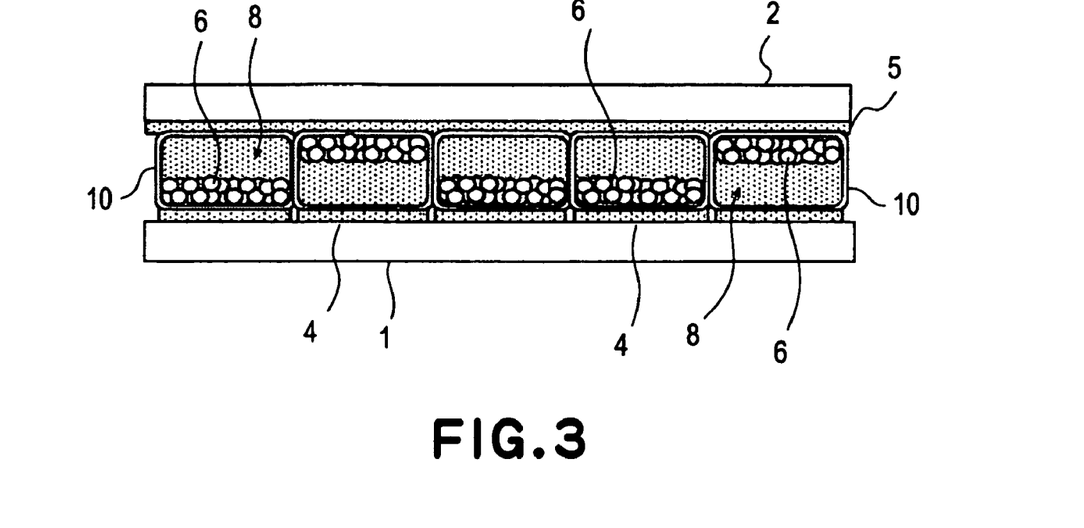
FIG. 3 is a schematic sectional view showing another embodiment of the electrophoretic display device.

In the above embodiment, the electrophoretic display device having such a structure that the electrophoretic dispersion liquid 8 is filled in the cell is described but an electrophoretic display device having such a structure, as shown in FIG. 3, that microcapsules 10 each containing therein electrophoretic particles 6 and an electrophoretic dispersion liquid 8 is disposed in place of the cell between a first substrate 1 and a second substrate 2. In the case of using such microcapsules 10, an insulating layer (9 shown in FIGS. 2(a) and 2(b)) may be omitted.

By controlling the electrophoretic particles in each microcapsule 10 under application of an electric field through a first electrode 4, it is possible to effect display of an arbitrary image or character.

The microcapsule 10 can be prepared by a known method, such as interfacial polymerization, in-situ polymerization, coacervation, etc. As a material for constituting the microcapsule 10, it is preferred to use a high-light transmissive material, such as urea-formaldehyde resin, melamine-formaldehyde resin, polyester, polyurethane, polyamide, polyethylene, polystyrene, polyvinyl alcohol, gelatin or their copolymers. A method of disposing the microcapsule 10 on the first substrate 1 is not particularly limited but may be an ink jet method using nozzles.

Hereinbelow, an electrophoretic display device using an electrophoretic dispersion liquid according to Second Embodiment of the present invention will be described.

Figure 4:
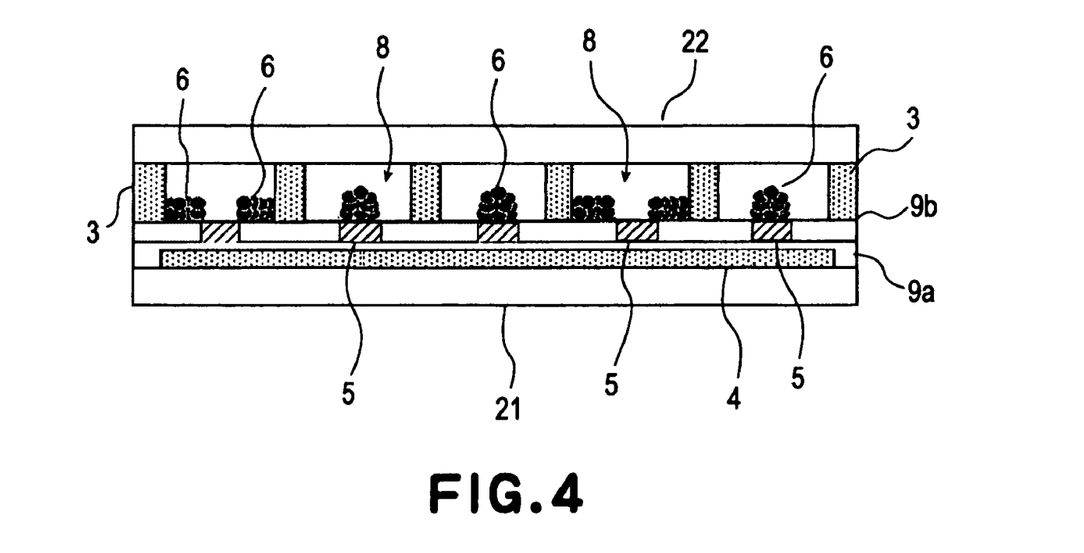
FIG. 4 is a schematic sectional view showing an embodiment of an electrophoretic display device using an electrophoretic dispersion liquid according to Second Embodiment of the present invention.

FIG. 4 is a sectional view of the electrophoretic display device, wherein the same reference numerals as in FIG. 1 represent members or means identical or corresponding to those shown in FIG. 1.

As shown in FIG. 4, the electrophoretic display device includes a first substrate 21 on which a first electrode 4 and a second electrode 5 are disposed. Between the electrodes 4 and 5 and on the second electrode 5, an insulating layer 9a and an insulating layer 9b are formed, respectively. The insulating layer 9a formed between the electrodes 4 and 5 may be colored or may be colorless and transparent, but the insulating layer 9b for electrically insulating the second electrode 5 is colorless and transparent.

The electrophoretic display device further includes a second substrate 22 disposed opposite to the first substrate 21 with a spacing through a partition wall 3. In a cell (space) defined by the pair of first and second substrates 21 and 22 and the partition wall 3, an electrophoretic dispersion liquid 8 comprising electrophoretic particles 6, an electrophoretic dispersion medium and a polymer is sealed. A display surface of the electrophoretic display device is located on the second substrate 22 side.

The second electrode 5 comprises a plurality of electrode portions as pixel electrodes and the first electrode 4 is a common electrode. The electrophoretic particles 6 in each individual cell are controlled by an electric field applied through the second electrode 5 so that at each pixel, the color (e.g., black) of the electrophoretic particles 6 or the color (e.g., white) of the insulating layer 9a can be selectively displayed.

The first substrate 21 is an arbitrary insulating member for supporting the electrophoretic display device and may be formed of glass or plastics. The second substrate 22 may be a transparent substrate or a transparent plastic substrate.

The first electrode 4 is a metal electrode of, e.g., Al exhibiting light reflection performance.

The insulating layer 9a formed on the first electrode 4 is formed of a mixture of a transparent colorless insulating resin with light scattering fine particles of, e.g., aluminum oxide or titanium oxide. As a material for the transparent colorless insulating resin, it is possible use the above described insulating resins. Incidentally, it is also possible to use a light scattering method utilizing unevenness at the surface of the metal electrode without using the fine particles.

The second electrode 5 is formed of an electroconductive material, which looks dark black from the viewer side of the electrophoretic display device, such as titanium carbide, black-treated Cr, and Al or Ti provided with a black surface layer. Pattern formation of the second electrode 5 may be performed through a photolithographic process.

On the second electrode 5, the insulating layer 9b is formed of, e.g., the transparent colorless insulating resin described above.

In this embodiment, a display contrast is largely depend on an a real ratio between the second electrode 5 (each electrode portion) and an associated pixel, so that an exposed area of the second electrode 5 is required to be smaller than that of the pixel in order to enhance a contrast. For this reason, it is preferable that the a real ratio therebetween may ordinarily be 1:2 to 1:5.

As the electrophoretic dispersion medium, it is possible to use the above described liquids, and as the electrophoretic particles, it is possible to use the above described particles. Further, as the polymer, it is possible to use the acidic polymers or the basic polymers described above.

Next, a display operation of the electrophoretic display device using the electrophoretic dispersion liquid according to this embodiment will be described.

Figure 5:
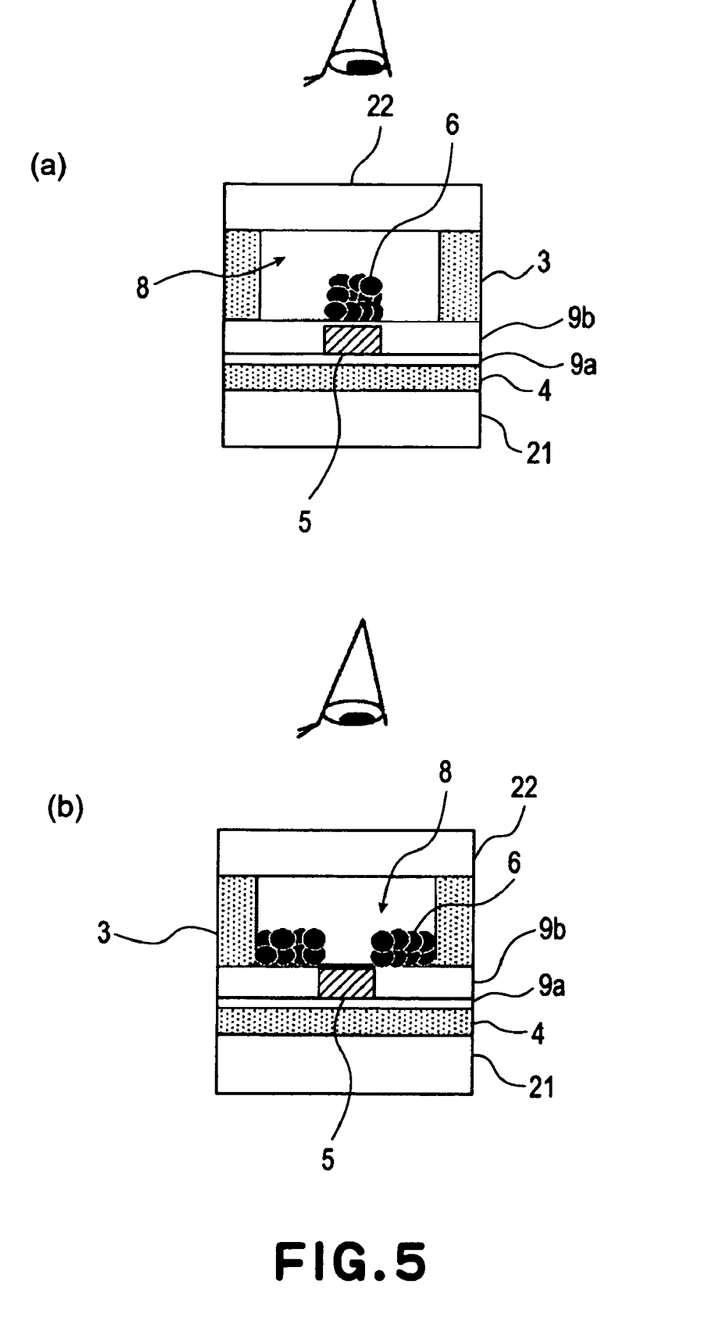
FIGS. 5(a) and 5(b) are schematic views showing a display example of the electrophoretic display device of Second Embodiment.

FIGS. 5(a) and 5(b) illustrate a display example wherein, e.g., an electrophoretic dispersion liquid 8 comprising black electrophoretic particles 6 surface-modified with an acidic group, a colorless and transparent electrophoretic dispersion medium, and a basic polymer is filled in a cell. The electrophoretic particles 6 surface-modified with the acidic group is negatively charged by the acid-base interaction with the basic polymer.

In the case where the color of the surface of the insulating layer 9a is white and the color of the surface of the second electrode 5 is black, when the electrophoretic particles 6 are collected on the surface of the second electrode 5 as shown in FIG. 5(a), it is possible to effect white display. On the other hand, when the electrophoretic particles 6 are collected on the surface of the insulating layer 9b (on the insulating layer 9a and the first electrode 4) as shown in FIG. 5(b), it is possible to effect black display. By performing such a drive pixel by pixel, it is possible to display an arbitrary image or character by use of a multiplicity of pixels.

As described above, as the acidic or basic polymer for impairing the chargeability and the dispersibility to the electrophoretic particles 6, the basic polymer having the acidic or basic group which is not precipitated in the electrophoretic dispersion medium at least in the low temperature environment of −20 to 0° C. is used. As a result, it is possible to provide an electrophoretic dispersion liquid 8 with reliability without causing deterioration in display quality even in the low temperature environment and an electrophoretic display device using the electrophoretic dispersion liquid 8.

Figure 6:
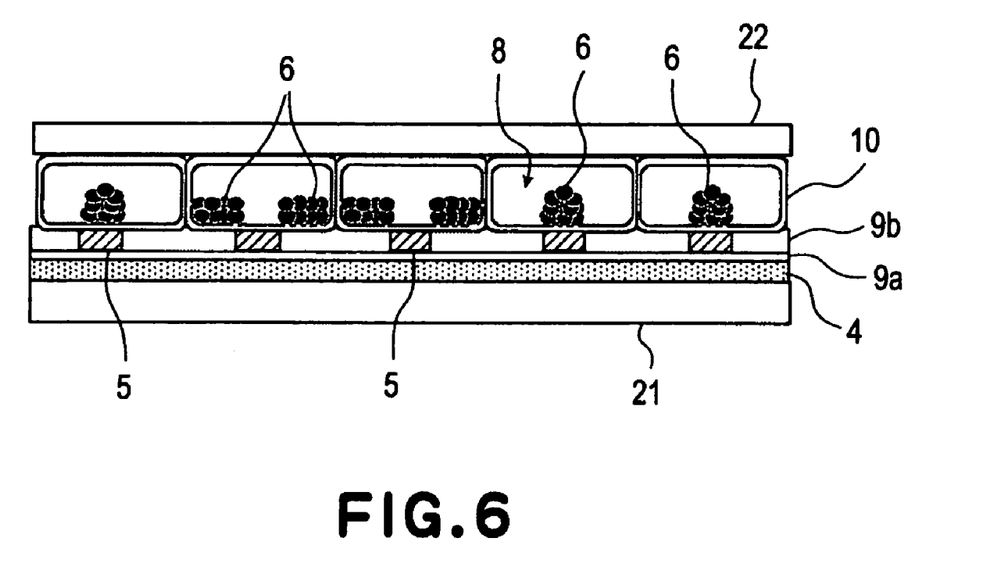
FIG. 6 is a schematic sectional view showing another embodiment of the electrophoretic display device of Second Embodiment.

In the above embodiment, the electrophoretic display device having such a structure that the electrophoretic dispersion liquid 8 is filled in the cell is described but an electrophoretic display device having such a structure, as shown in FIG. 6, that microcapsules 10 each containing therein electrophoretic particles 6 and an electrophoretic dispersion liquid 8 is disposed in place of the cell between a first substrate 1 and a second substrate 2. In the case of using such microcapsules 10, an insulating layer (9a and/or 9b shown in FIGS. 5(a) and 5(b)) may be omitted.

By controlling the electrophoretic particles in each microcapsule 10 under application of an electric field through a second electrode 5, it is possible to effect display of an arbitrary image or character.

The microcapsule 10 can be prepared by the above described method. A method of disposing the microcapsule 10 on the first substrate 1 is not particularly limited but may be an ink jet method using nozzles.

Hereinbelow, the present invention will be described more specifically based on Examples as specific examples of First and Second Embodiments described above.

EXAMPLE 1

A uniform mixture liquid was prepared by mixing titanium oxide which was subjected to hydrophobicity-imparting treatment, and azobisisobutyronitrile (AIBN) (polymerization initiator) in hexadecyl methacrylate. In a dispersion medium comprising a sodium dodecyl sulfonate aqueous solution and calcium phosphate dispersed therein, the uniform mixture liquid was added. The resultant liquid was stirred at 10,000 rpm for 15 minutes by a homogenizer to prepare a suspension. Thereafter, the suspension was subjected to polymerization at 80° C. for 7 hours in a nitrogen atmosphere. After the polymerization, the resultant polymer particles were washed with hydrochloric acid and then with water, followed by drying and classification to obtain white electrophoretic particles each comprising titanium oxide particle coated with polyhexadecyl methacrylate. An average particle size of the electrophoretic particles was about 2 microns.

Then, 5 wt. % of the white electrophoretic particles (modified with the basic group), 2 wt. % of an acidic polymer 8 (polyisoprene-graft-monomethyl maleate; liquid polymer having a number-average molecular weight of 25,000; the number of acidic group per one molecule: about 10), and 93 wt. % of an electrophoretic dispersion medium comprising isoparaffin (trade name: "Isopar H", mfd. by Exxon Corp.) and 0.1 wt. % of a colorant ("Oil Blue N", mfd. by Aldrich Co.) dissolved therein, were mixed to Aldrich Co.) dissolved therein, were mixed to prepare an electrophoretic dispersion liquid. The electrophoretic dispersion liquid was injected into a cell by using nozzles according to an ink jet method to provide an electrophoretic display device, as shown in FIG. 1, which was connected with a voltage application circuit.

When the resultant electrophoretic display device was subjected to blue/white contrast display in a low temperature environment of −20° C. to 0° C., it was possible to effect clear blue/white display. Further, during the display operation, the acidic polymer imparted a positive chargeability and a dispersibility to the electrophoretic particles 6 and was not precipitated in the electrophoretic dispersion medium.

According to this example, it was confirmed that the resultant electrophoretic display device which was not deteriorated in electrophoretic display quality even in the low temperature environment.

EXAMPLE 2

A plurality of microcapsules each containing an electrophoretic dispersion liquid identical to that used in Example 1 were prepared by in-situ polymerization method. Each microcapsule was formed of urea-formaldehyde resin as a film-forming material. An electrophoretic display device shown in FIG. 3 was prepared by disposing the plurality of microcapsules on a first substrate 1 by use of nozzles according to the ink jet method. The electrophoretic display device was connected with a voltage application circuit.

When the resultant electrophoretic display device was subjected to blue/white contrast display in a low temperature environment of −20° C. to 0° C., it was possible to effect clear blue/white display. Further, during the display operation, the acidic polymer imparted a positive chargeability and a dispersibility to the electrophoretic particles 6 and was not precipitated in the electrophoretic dispersion medium.

According to this example, it was confirmed that the resultant electrophoretic display device which was not deteriorated in electrophoretic display quality even in the low temperature environment.

EXAMPLE 3

One wt. % of acidic carbon black (pH=3; average particle size=26 nm), 0.7 wt. % of a basic polymer 8 (polybutadiene-graft-N-(3-aminopropyl)(meth)acrylate; liquid polymer having a number-average molecular weight of 30,000; the number of acidic group per one molecule: about 12), and 98.3 wt. % of an electrophoretic dispersion medium of isoparaffin (trade name: "Isopar H", mfd. by Exxon Corp.), were mixed to Aldrich Co.) dissolved therein, were mixed to prepare an electrophoretic dispersion liquid. The electrophoretic dispersion liquid was injected into a cell by using nozzles according to an ink jet method to provide an electrophoretic display device, as shown in FIG. 4, which was connected with a voltage application circuit.

When the resultant electrophoretic display device was subjected to black/white contrast display in a low temperature environment of −20° C. to 0° C., it was possible to effect clear black/white display. Further, during the display operation, the basic polymer imparted a negative chargeability and a dispersibility to the electrophoretic particles 6 and was not precipitated in the electrophoretic dispersion medium.

According to this example, it was confirmed that the resultant electrophoretic display device which was not deteriorated in electrophoretic display quality even in the low temperature environment.

EXAMPLE 4

A plurality of microcapsules each containing an electrophoretic dispersion liquid identical to that used in Example 3 were prepared by interfacial polymerization method. Each microcapsule was formed of polyamide resin as a film-forming material. An electrophoretic display device shown in FIG. 6 was prepared by disposing the plurality of microcapsules on a first substrate 1 by use of nozzles according to the ink jet method. The electrophoretic display device was connected with a voltage application circuit.

When the resultant electrophoretic display device was subjected to black/white contrast display in a low temperature environment of −20° C. to 0° C., it was possible to effect clear black/white display. Further, during the display operation, the basic polymer imparted a negative chargeability and a dispersibility to the electrophoretic particles 6 and was not precipitated in the electrophoretic dispersion medium.

According to this example, it was confirmed that the resultant electrophoretic display device which was not deteriorated in electrophoretic display quality even in the low temperature environment.

INDUSTRIAL APPLICABILITY

As described hereinabove, according to the present invention, it is possible to provide an electrophoretic dispersion liquid for an electrophoretic display device capable of displaying desired image and character with reliability without causing a deterioration of display performance even in a low temperature environment (e.g., from 0° C. to −20° C.). The present invention further provides a display apparatus using such an electrophoretic dispersion liquid.

The invention claimed is:

1. A display apparatus, comprising:
    a display panel including pixels arranged in a matrix, each of said pixels being capable of retaining a written display state without applying a voltage to said pixel after completion of writing,
    pixel electrodes provided to said pixels, respectively, and a common electrode provided commonly to said pixels,
    scanning lines and signal lines for supplying a voltage to said pixel electrodes,
    a drive circuit connected to said common electrode, said scanning lines, and said signal lines, and
    a control circuit for providing a signal to said drive circuit,
    wherein said control circuit selectively switches between a display drive mode in which said display panel displays an image through sequential scanning of said scanning lines and application of a variable voltage to pixels via said signal lines by said drive circuit and a rewriting drive mode in which selected pixels are rewritten into black or white through application of a voltage, which is higher than a range of the variable voltage, to the selected pixels on a scanning line selected by said drive circuit.

2. An apparatus according to claim 1, wherein said drive circuit selectively scans only a part of the scanning lines in the rewriting drive mode.

3. An apparatus according to claim 1, wherein in the display drive mode, said drive circuit supplies a variable voltage to said pixel electrodes and a reference voltage to said common electrode, and in the rewriting drive mode, said drive circuit supplies the voltage higher than the range of the variable voltage to a pixel electrode of pixels to be rewritten, places a pixel electrode not to be rewritten in a high-impedance state, and supplies to said common electrode a voltage which is shifted from the reference voltage to an opposite-polarity side of the voltage supplied to the pixel electrode of pixels to be rewritten.

4. An apparatus according to claim 1, wherein said display apparatus further comprises an external input device, and when display information is received from a device other than the external input device, said control circuit selects the display drive mode to execute display of the display information on said display panel, and when display information is received from the external input device, said control circuit selects the rewriting drive mode to execute display of the display information received from the external input device.

5. An apparatus according to claim 4, wherein the external input device is a position information input device superposed on said display panel.

6. An apparatus according to claim 5, wherein the external input device is a pen input device or a handwriting input device.

7. An apparatus according to claim 1, wherein said display apparatus is an electrophoretic display apparatus.

8. An apparatus according to claim 1, wherein said display apparatus is a liquid crystal display apparatus.

9. An input apparatus, comprising:
    a display panel including pixels arranged in a matrix, each of said pixels being capable of retaining a written display state without applying a voltage to said pixel after completion of writing,
    pixel electrodes provided to said pixels, respectively, and a common electrode provided commonly to said pixels,
    scanning lines and signal lines for supplying a voltage to said pixel electrodes,
    a drive circuit connected to said common electrode, said scanning lines, and said signal lines,
    a control circuit for providing a signal to said drive circuit,
    a position detection device for detecting a position designated by a positioning member and outputting information on the detected position,
    wherein when there is no output of said position detection device, said control circuit selects a display drive mode in which a gradation image is displayed on said display panel and said drive circuit applies a variable voltage to pixels through said scanning and data lines to display the gradation image on said display panel, and when there is an output of said position detection device, said control circuit selects a rewriting drive mode in which selected pixels of said display panel are rewritten into black or white and said drive circuit scans a part of said scanning lines and applies a voltage, which is higher than a range of said variable voltage, to the selected pixels to rewrite the selected pixels corresponding to the position designated by the pointing member.

* * * * *